US010299648B2

United States Patent
Peters et al.

(10) Patent No.: US 10,299,648 B2
(45) Date of Patent: May 28, 2019

(54) VACUUM CLEANER

(71) Applicant: Dyson Technology Limited, Wiltshire (GB)

(72) Inventors: Laurent James Peters, Bristol (GB); William Henry Kerr, Bristol (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 140 days.

(21) Appl. No.: 15/410,419

(22) Filed: Jan. 19, 2017

(65) Prior Publication Data
US 2017/0209012 A1 Jul. 27, 2017

(30) Foreign Application Priority Data
Jan. 22, 2016 (GB) .................................. 1601219.7

(51) Int. Cl.
*A47L 5/26* (2006.01)
*A47L 9/16* (2006.01)
(Continued)

(52) U.S. Cl.
CPC ............... *A47L 9/1683* (2013.01); *A47L 5/26* (2013.01); *A47L 9/106* (2013.01); *A47L 9/1608* (2013.01);
(Continued)

(58) Field of Classification Search
CPC ............... B01D 45/12; B01D 46/0065; B01D 46/2403; B01D 2279/55; A47L 9/106;
(Continued)

(56) References Cited

U.S. PATENT DOCUMENTS 2,187,546 A 1/1940 Orem
2,500,832 A 3/1950 Kirby
(Continued)

FOREIGN PATENT DOCUMENTS

CN 1781434 6/2006
CN 201332997 10/2009
(Continued)

OTHER PUBLICATIONS

English language machine translation for WO 2016/097645 A1. Retrieved from http://translationportal.epo.org on Jul. 31, 2018. (Year: 2018).*
(Continued)

*Primary Examiner* — Jason M Greene
(74) *Attorney, Agent, or Firm* — Morrison & Foerster LLP

(57) ABSTRACT

A vacuum cleaner including a cyclonic separating unit that includes a cyclonic separator having a separator axis and an end wall which is openable for the removal of dirt from the cyclonic separator, a screen disposed within the cyclonic separator such that it extends in the longitudinal direction of the cyclonic separator, wherein the cyclonic separator is movable relative to the screen between a first position and a second position in the longitudinal direction of the cyclonic separator; a catch arranged to secure the openable end wall in a closed position; and an actuator which is actuated to release the catch when the cyclonic separator is moved into the second position. In an alternative embodiment, there is provided a vacuum cleaner apparatus in which the actuator is enabled for subsequent release of the catch when the cyclonic separator is moved into the second position.

27 Claims, 16 Drawing Sheets

(51) Int. Cl.

| | | |
|---|---|---|
| A47L 9/20 | (2006.01) | |
| B04C 5/22 | (2006.01) | |
| B04C 5/26 | (2006.01) | |
| B04C 5/28 | (2006.01) | |
| B04C 9/00 | (2006.01) | |
| B01D 46/00 | (2006.01) | |
| B01D 46/24 | (2006.01) | |
| B01D 50/00 | (2006.01) | |
| A47L 9/10 | (2006.01) | |

(52) U.S. Cl.
CPC .............. *A47L 9/1616* (2013.01); *A47L 9/20* (2013.01); *B01D 46/0065* (2013.01); *B01D 46/2403* (2013.01); *B01D 50/002* (2013.01); *B04C 5/22* (2013.01); *B04C 5/26* (2013.01); *B04C 5/28* (2013.01); *B04C 9/00* (2013.01); *B01D 2279/55* (2013.01); *B04C 2009/004* (2013.01)

(58) Field of Classification Search
CPC .... A47L 9/1608; A47L 9/1616; A47L 9/1625; A47L 9/1683; A47L 9/20; B04C 5/26
See application file for complete search history.

(56) References Cited

U.S. PATENT DOCUMENTS

| | | |
|---|---|---|
| 2,520,589 A | 8/1950 | White |
| 2,566,153 A | 8/1951 | Acheson |
| 2,594,456 A | 4/1952 | Kroenlein |
| 2,942,690 A | 6/1960 | Carpenter |
| 3,755,992 A | 9/1973 | Ylinen |
| 4,007,026 A | 2/1977 | Groh |
| 4,246,011 A | 1/1981 | Oberdorfer |
| 4,329,161 A | 5/1982 | Osborn |
| 4,643,748 A | 2/1987 | Dyson |
| 5,307,538 A | 5/1994 | Rench et al. |
| 5,603,740 A | 2/1997 | Roy |
| 5,951,746 A | 9/1999 | Treitz et al. |
| 6,192,550 B1 | 2/2001 | Hamada et al. |
| 6,458,178 B1 | 10/2002 | Dietz et al. |
| 7,272,871 B1 | 9/2007 | Mudd |
| 2001/0025395 A1 | 10/2001 | Matsumoto et al. |
| 2002/0124729 A1 | 9/2002 | Dudley |
| 2002/0166199 A1 | 11/2002 | Boles et al. |
| 2003/0159235 A1 | 8/2003 | Oh |
| 2003/0159236 A1 | 8/2003 | Oh |
| 2003/0159237 A1 | 8/2003 | Oh |
| 2003/0208879 A1 | 11/2003 | Oh et al. |
| 2003/0221278 A1 | 12/2003 | Oh |
| 2004/0025285 A1 | 2/2004 | McCormick et al. |
| 2004/0025287 A1 | 2/2004 | McCormick et al. |
| 2004/0163206 A1 | 8/2004 | Oh |
| 2004/0177471 A1 | 9/2004 | Jung et al. |
| 2004/0187253 A1 | 9/2004 | Jin et al. |
| 2004/0200029 A1 | 10/2004 | Jin et al. |
| 2005/0011036 A1 | 1/2005 | McCutchen |
| 2005/0120510 A1 | 6/2005 | Weber |
| 2005/0132528 A1 | 6/2005 | Yau |
| 2005/0183233 A1 | 8/2005 | Lin |
| 2005/0198766 A1 | 9/2005 | Nam et al. |
| 2005/0217067 A1 | 10/2005 | Rew et al. |
| 2005/0229355 A1* | 10/2005 | Crouch ................ A47L 9/1683 15/352 |
| 2006/0042202 A1 | 3/2006 | Lee et al. |
| 2006/0107628 A1 | 5/2006 | Yoshida et al. |
| 2006/0137301 A1 | 6/2006 | Lee |
| 2007/0017064 A1 | 1/2007 | Gogel et al. |
| 2007/0125049 A1 | 6/2007 | Menrik et al. |
| 2007/0174993 A1 | 8/2007 | Dever et al. |
| 2007/0186522 A1 | 8/2007 | Hato |
| 2007/0209148 A1 | 9/2007 | Yacobi et al. |
| 2007/0220842 A1 | 9/2007 | Oh |
| 2007/0226948 A1 | 10/2007 | Due |
| 2007/0289444 A1 | 12/2007 | Tsuchiya |
| 2007/0294857 A1 | 12/2007 | Heinrichs |
| 2008/0040883 A1 | 2/2008 | Beskow et al. |
| 2008/0092498 A1 | 4/2008 | Stewen et al. |
| 2008/0168616 A1 | 7/2008 | Tanaka et al. |
| 2008/0235901 A1 | 10/2008 | Tanaka et al. |
| 2008/0250600 A1 | 10/2008 | Windrich |
| 2008/0302070 A1 | 12/2008 | Castronovo |
| 2009/0000485 A1 | 1/2009 | Valentini |
| 2009/0183338 A1 | 7/2009 | Van Raalte et al. |
| 2009/0307863 A1* | 12/2009 | Milne ................... A47L 9/1683 15/344 |
| 2009/0313783 A1 | 12/2009 | Nakano et al. |
| 2010/0024367 A1* | 2/2010 | Howes ................. A47L 9/1683 55/447 |
| 2010/0132153 A1 | 6/2010 | Leibold et al. |
| 2010/0132319 A1* | 6/2010 | Ashbee ................ A47L 9/1683 55/429 |
| 2010/0192776 A1 | 8/2010 | Oh et al. |
| 2010/0293743 A1 | 11/2010 | Beskow et al. |
| 2010/0319307 A1 | 12/2010 | Kim et al. |
| 2011/0017236 A1 | 1/2011 | Jonsson et al. |
| 2011/0226130 A1 | 9/2011 | Kienzle et al. |
| 2012/0047683 A1 | 3/2012 | Kim et al. |
| 2012/0192378 A1 | 8/2012 | Bassett |
| 2012/0311814 A1 | 12/2012 | Kah, Jr. |
| 2014/0137363 A1* | 5/2014 | Wilson ................. A47L 9/1683 15/347 |

FOREIGN PATENT DOCUMENTS

| | | |
|---|---|---|
| CN | 101675871 | 3/2010 |
| CN | 102247109 | 11/2011 |
| DE | 1 059 636 | 6/1959 |
| DE | 1 214 366 | 4/1966 |
| DE | 30 02 266 | 7/1981 |
| DE | 195 01 715 | 7/1996 |
| DE | 197 04 468 | 8/1998 |
| EP | 0 836 827 | 4/1998 |
| EP | 1 118 303 | 7/2001 |
| EP | 1 340 446 | 9/2003 |
| EP | 1 380 246 | 1/2004 |
| EP | 1-854-391 | 11/2007 |
| EP | 2 225 993 | 9/2010 |
| FR | 2 558 712 | 2/1985 |
| GB | 400023 | 10/1933 |
| GB | 482712 | 3/1938 |
| GB | 514140 | 10/1939 |
| GB | 564138 | 9/1944 |
| GB | 564139 | 9/1944 |
| GB | 673622 | 6/1952 |
| GB | 807329 | 1/1959 |
| GB | 2 360 471 | 9/2001 |
| GB | 2 431 096 | 4/2007 |
| GB | 2508035 | 5/2014 |
| JP | 43-10787 | 5/1968 |
| JP | 48-27665 | 4/1973 |
| JP | 48-44734 | 12/1973 |
| JP | 50-121560 | 10/1975 |
| JP | 52-34571 | 3/1977 |
| JP | 53-145360 | 12/1978 |
| JP | 54-22366 | 2/1979 |
| JP | 54-93273 | 7/1979 |
| JP | 54-107160 | 8/1979 |
| JP | 54-117159 | 9/1979 |
| JP | 55-84133 | 6/1980 |
| JP | 55-84134 | 6/1980 |
| JP | 56-30864 | 3/1981 |
| JP | 27-103057 | 6/1982 |
| JP | 63-175558 | 11/1988 |
| JP | 5-76803 | 3/1993 |
| JP | 8-103405 | 4/1996 |
| JP | 11-9527 | 1/1999 |
| JP | 11-187987 | 7/1999 |
| JP | 2002-28107 | 1/2002 |
| JP | 2002-315701 | 10/2002 |
| JP | 2003-38397 | 2/2003 |
| JP | 2003-38398 | 2/2003 |

(56) References Cited

FOREIGN PATENT DOCUMENTS

| | | |
|---|---|---|
| JP | 2003-190056 | 7/2003 |
| JP | 2003-230516 | 8/2003 |
| JP | 2003-310507 | 11/2003 |
| JP | 2003-339593 | 12/2003 |
| JP | 2003-339594 | 12/2003 |
| JP | 2003-339595 | 12/2003 |
| JP | 2003-339596 | 12/2003 |
| JP | 2004-33241 | 2/2004 |
| JP | 2004-89703 | 3/2004 |
| JP | 2004-121722 | 4/2004 |
| JP | 2004-194977 | 7/2004 |
| JP | 2004-298495 | 10/2004 |
| JP | 2005-13312 | 1/2005 |
| JP | 2005-58787 | 3/2005 |
| JP | 2005-168775 | 6/2005 |
| JP | 2005-177289 | 7/2005 |
| JP | 2005-185398 | 7/2005 |
| JP | 2005-218561 | 8/2005 |
| JP | 2005-237732 | 9/2005 |
| JP | 2005-270504 | 10/2005 |
| JP | 2006-6453 | 1/2006 |
| JP | 2006-6454 | 1/2006 |
| JP | 2006-101904 | 4/2006 |
| JP | 2006-320453 | 11/2006 |
| JP | 2007-20685 | 2/2007 |
| JP | 2007-20767 | 2/2007 |
| JP | 2007-20769 | 2/2007 |
| JP | 2007-89755 | 4/2007 |
| JP | 2007-125294 | 5/2007 |
| JP | 2008-23043 | 2/2008 |
| JP | 2008-35887 | 2/2008 |
| JP | 2008-67954 | 3/2008 |
| JP | 2008-68036 | 3/2008 |
| JP | 2008-80146 | 4/2008 |
| JP | 2008-100005 | 5/2008 |
| JP | 2008-173263 | 7/2008 |
| JP | 2008-194177 | 8/2008 |
| JP | 2008-228935 | 10/2008 |
| JP | 2008-246233 | 10/2008 |
| JP | 2008-253670 | 10/2008 |
| JP | 2008-289661 | 12/2008 |
| JP | 2009-55980 | 3/2009 |
| JP | 2009-56029 | 3/2009 |
| JP | 2009-56039 | 3/2009 |
| JP | 2009-82542 | 4/2009 |
| JP | 2009-112506 | 5/2009 |
| JP | 2009-136616 | 6/2009 |
| JP | 2009-165690 | 7/2009 |
| JP | 2009-183525 | 8/2009 |
| JP | 2009-207746 | 9/2009 |
| JP | 2009-225993 | 10/2009 |
| JP | 2009-268564 | 11/2009 |
| JP | 2010-11905 | 1/2010 |
| JP | 2010-17439 | 1/2010 |
| JP | 2010-35624 | 2/2010 |
| JP | 2010-42045 | 2/2010 |
| JP | 2010-51750 | 3/2010 |
| JP | 2010-63817 | 3/2010 |
| JP | 2010-82236 | 4/2010 |
| JP | 2010-94438 | 4/2010 |
| JP | 2010-119495 | 6/2010 |
| JP | 2010-125430 | 6/2010 |
| KR | 2002-0004576 | 1/2002 |
| KR | 2002-0056301 | 7/2002 |
| KR | 2002-0056320 | 7/2002 |
| KR | 10-2006-0098765 | 9/2006 |
| RU | 1808355 | 4/1993 |
| WO | WO-2008/009024 | 1/2008 |
| WO | WO-2008/145960 | 12/2008 |
| WO | WO-2009/041890 | 4/2009 |
| WO | WO-2009/081946 | 7/2009 |
| WO | WO-2010/044541 | 4/2010 |
| WO | WO-2010/104228 | 9/2010 |
| WO | WO-2010/128625 | 11/2010 |
| WO | WO-2011/012479 | 2/2011 |
| WO | WO-2012/009782 | 1/2012 |
| WO | WO-2012/113414 | 8/2012 |
| WO | 2016/097645 | 6/2016 |
| WO | WO 2016/097645 A1 * | 7/2016 ............... A47L 5/24 |

OTHER PUBLICATIONS

International Search Report and Written Opinion dated Mar. 15, 2017, directed to International Application No. PCT/GB2016/053915; 11 pages.
Search Report dated Apr. 25, 2018, directed to GB Application No. 1804258.0; 1 page.
Search Report dated Jul. 15, 2016, directed to GB Application No. 1601219.7; 1 page.

* cited by examiner

VACUUM CLEANER

REFERENCE TO RELATED APPLICATIONS

This application claims the priority of United Kingdom Application No. 1601219.7, filed Jan. 22, 2016, the entire contents of which are incorporated herein by reference.

FIELD OF THE INVENTION

This invention relates to a vacuum cleaner comprising a cyclonic separator.

BACKGROUND OF THE INVENTION

GB2508035A discloses a vacuum cleaner having a cyclonic separator comprising a first cyclonic separating unit and second cyclonic separating unit disposed downstream of the first cyclonic separating unit. The first cyclonic separating unit comprises a bin for collecting dirt separated by the first cyclonic separating unit. The bin has a base that can be opened in order to remove debris for disposal. In addition, the bin can be detached from the second cyclonic separating unit for cleaning.

If bundles of carpet fibres, hair or other bulky debris can become trapped between the central shroud and the bin, a user has to pull the debris from between the bin and the shroud in order to empty the bin through the bin base using their fingers or a suitable implement. Alternatively, the user can completely detach the bin from the second cyclonic unit for emptying. Removal and subsequent replacement of the bin is inconvenient. Furthermore, if the user does not empty the bin completely, large debris that remains in the bin can become trapped between the dirt collector for the second cyclonic separating unit and the bin base thereby allowing air and large debris to be drawn directly into the flow downstream of the first cyclonic separator, risking clogging of the pre-motor filter and damage to the motor.

SUMMARY OF THE INVENTION

According to a first aspect of the present invention there is provided a vacuum cleaning apparatus comprising a cyclonic separating unit comprising a cyclonic separator having a separator axis and an end wall which is openable for the removal of dirt from the cyclonic separator; a screen disposed within the cyclonic separator such that it extends in the longitudinal direction of the cyclonic separator, wherein the cyclonic separator is movable relative to the screen between a first position and a second position in the longitudinal direction of the cyclonic separator; a catch arranged to secure the openable end wall in a closed position; an actuator which is actuable to release the catch; and a locking mechanism having a first configuration in which the locking mechanism engages the actuator to prevent actuation and a second configuration in which the locking mechanism is disengaged from the actuator such that the actuator can be actuated to release the catch, the locking mechanism is arranged such that the locking mechanism is engaged with the actuator when the cyclonic separator is in the first position and the locking mechanism is disengaged from the actuator when the cyclonic separator is in the second position.

The locking mechanism can prevent a user from attempting to empty the cyclonic separator when the vacuum cleaning apparatus is in a configuration in which it may be difficult to remove dirt that has become trapped inside the cyclonic separator. The second position is therefore preferably a position in which at least part of the cyclonic separator has been moved in a direction away from the screen.

The locking mechanism may comprise a second catch mounted on the cyclonic separating unit. The second catch may be arranged to pivot into and out of engagement with the actuator.

The vacuum cleaning apparatus may comprise a slider which slides relative to the cyclonic separator when the cyclonic separator is moved between the first position and the second position. The slider may comprise a formation which acts on the second catch to pivot the second catch out of engagement with the actuator as the cyclonic separator is moved into the second position. The vacuum cleaning apparatus may be detachably connected to a body portion of the vacuum cleaner of which it may form a part.

According to a second aspect of the invention, there is provided a vacuum cleaner comprising cyclonic separating unit comprising a cyclonic separator having a separator axis and an end wall which is openable for the removal of dirt from the cyclonic separator; a screen disposed within the cyclonic separator such that it extends in the longitudinal direction of the cyclonic separator, wherein the cyclonic separator is movable relative to the screen between a first position and a second position in the longitudinal direction of the cyclonic separator; a catch arranged to secure the openable end wall in a closed position; and an actuator which is actuable to release the catch, wherein the actuator is arranged such that movement of the cyclonic separator into the second position actuates the actuator thereby releasing the catch.

The catch is therefore release automatically by movement of the cyclonic separator into the second position. Automatic rather than manual release of the catch ensures that the end wall is opened only when the cyclonic separator is in the second position. The second position is preferably a position in which at least part of the cyclonic separator has been moved in a direction away from the screen.

The vacuum cleaner may comprise a body and an actuating element rotatably connected to the body and arranged to rotate between a first position and a second position. The actuating element may have an actuating portion that is brought into contact with the actuator when the cyclonic separator is moved into the second position thereby actuating the actuator. The catch is therefore released allowing the end wall to be opened. The actuating portion may be arranged such that it prevents subsequent closing of the end wall while the actuator is in the second position.

The actuator may be arranged to move relative to the cyclonic separator from a first position to a second position in order to release the catch. The actuating portion of the actuating element may act against the actuator in order to move the actuator from the first position into the second position.

The vacuum cleaner may further comprise a slider that is fixed for movement with the screen, the slider is arranged to engage the actuating element such that movement of the cyclonic separator between the first position and the second position rotates the actuating element between its first and second position.

The screen may be tubular. The cyclonic separator may comprise a wipe that is arranged to wipe the screen when the cyclonic separator is moved from the first position into the second position The wipe may be annular. The wipe may surround at least part of the tubular screen. The wipe may have a frusto-conical shape. The wipe may be arranged such that the wipe tapers inwardly towards the screen and the lower inner peripheral edge of the wipe contacts the screen. The screen may extend in the longitudinal direction of the cyclonic separator, the screen having a lower edge which is spaced from the openable end wall when the openable end wall is in a closed position, wherein movement of the cyclonic separator from the first position into the second position moves the lower inner peripheral edge of the wipe along the screen and over the lower edge of the screen such that debris is swept over the lower edge of the screen into the dirt collector.

The cyclonic separating unit may comprise a bin which forms an outer wall of the cyclonic separator. The wipe may be attached to the bin. The wipe may comprise an elastomeric material.

BRIEF DESCRIPTION OF THE DRAWINGS

In order to better understand the present invention, and to show more clearly how the invention may be put into effect, the invention will now be described, by way of example, with reference to the following drawings.

DETAILED DESCRIPTION OF THE INVENTION

Figure 1:
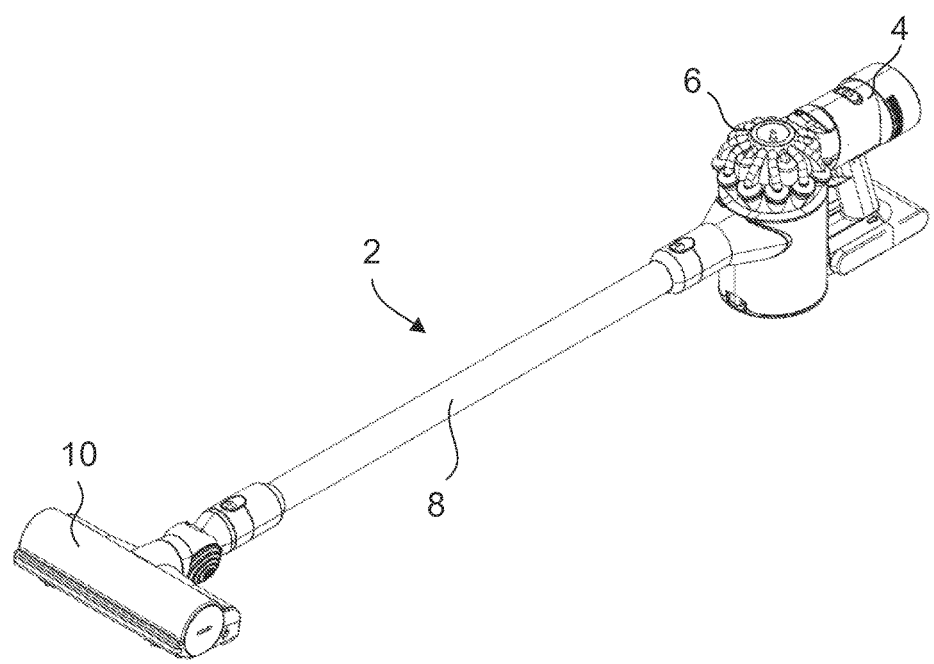
FIG. 1 shows a first embodiment of a vacuum cleaner.

FIG. 1 shows a stick vacuum 2 cleaner comprising a main body 4, a cyclonic separating apparatus 6, a wand 8 and a cleaner head 10.

Figure 2:
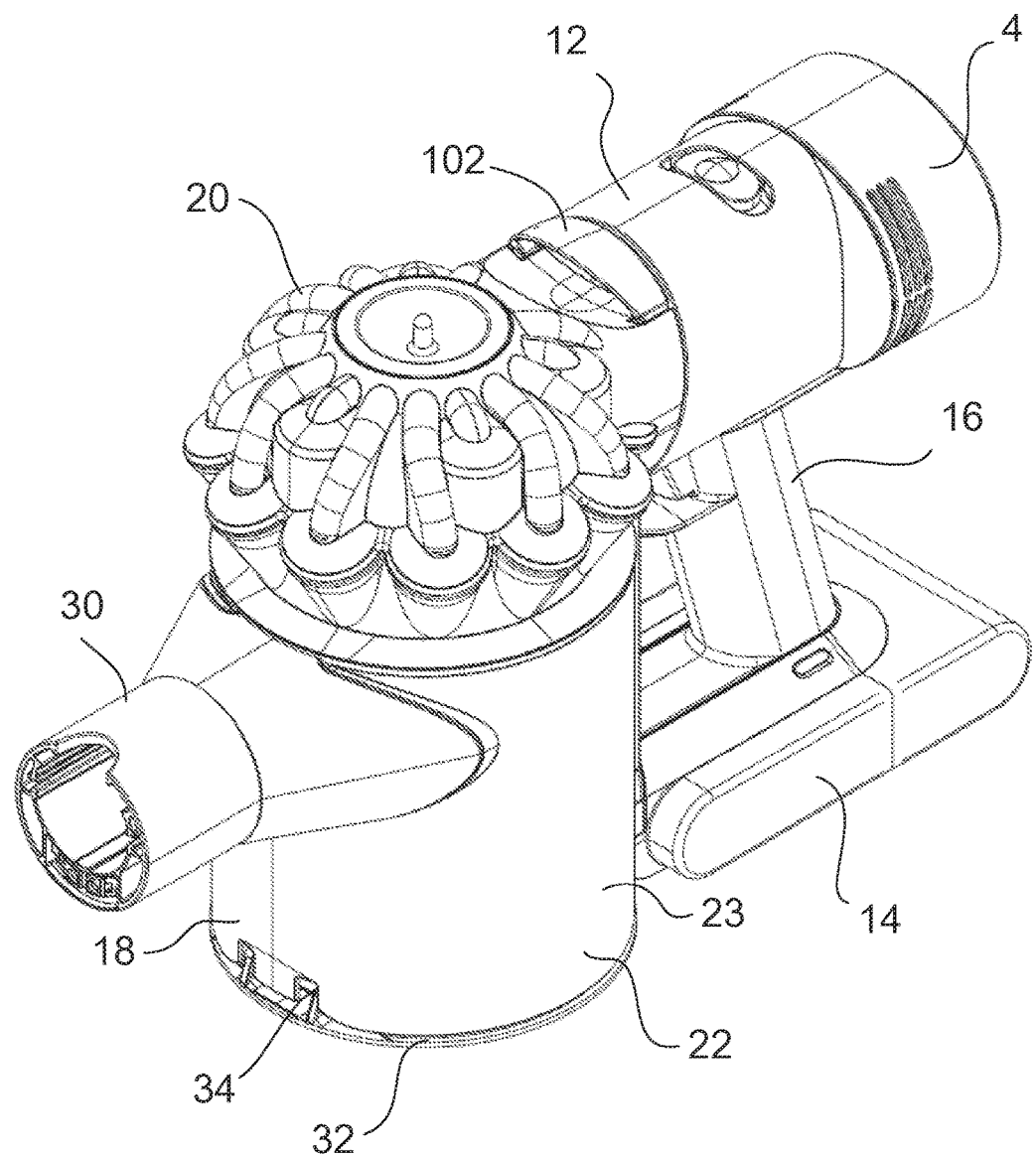
FIG. 2 shows a main body and a cyclonic separating apparatus of the vacuum cleaner shown in FIG. 1.
Figure 3:
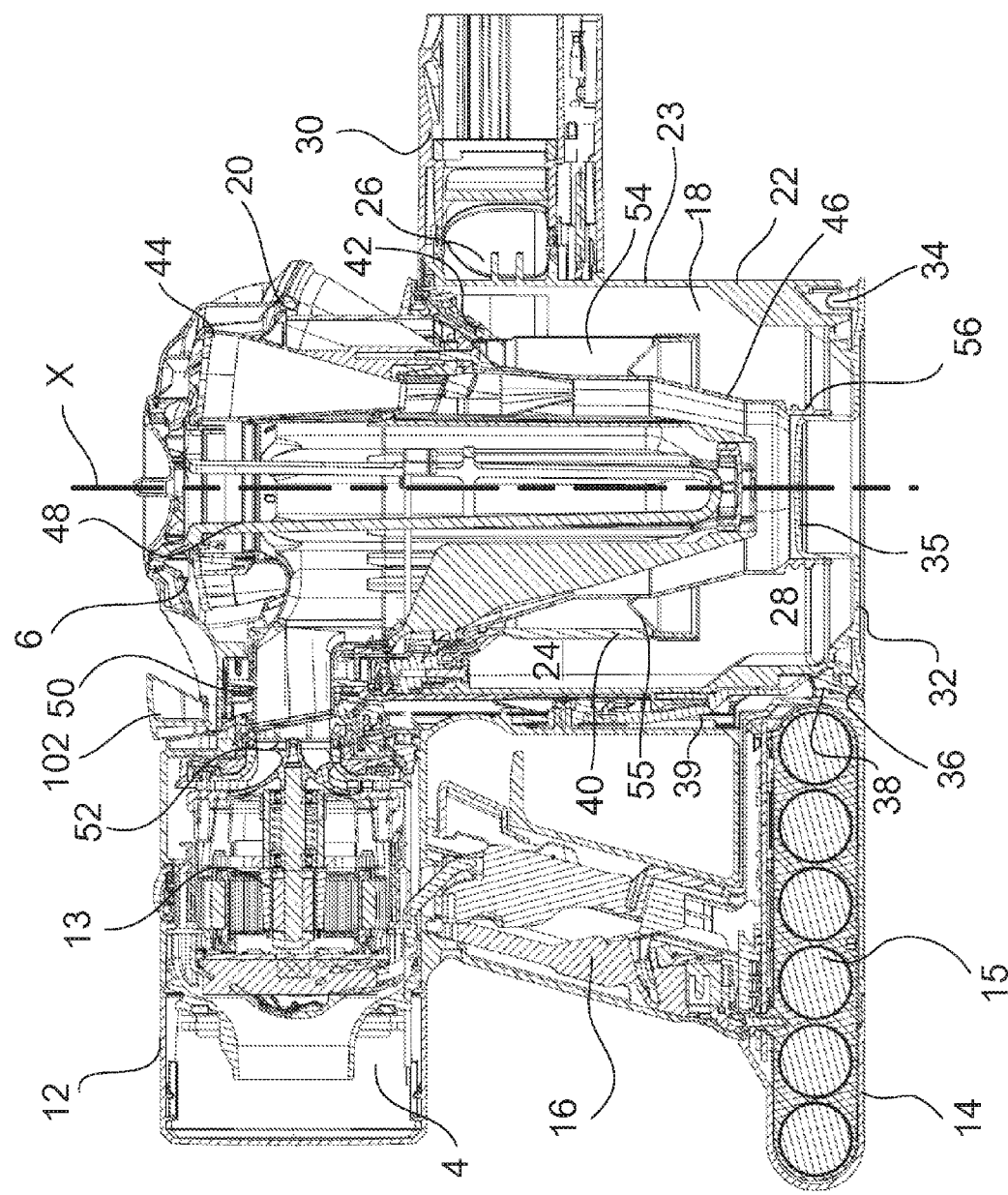
FIG. 3 is a cross-sectional view of the main body and the cyclonic separating apparatus shown in FIG. 2.

FIGS. 2 and 3 show the main body 4 and the cyclonic separating apparatus 6 in isolation. The main body 4 has an upper portion 12 housing a motor and fan unit 13 and a lower portion 14 housing a power supply in the form of a battery pack 15. A handle 16 for holding the vacuum cleaner 2 during use extend from the upper portion 12 to the lower portion 14.

The cyclonic separating apparatus 6 is detachably connected to the main body 4. The cyclonic separating apparatus 6 comprises a first cyclonic separating unit 18 and a second cyclonic separating unit 20.

The first cyclonic separating unit 18 comprises a bin 22 having a cylindrical outer wall 23. An upper portion of the bin 22 defines a cyclonic separating chamber 24 having a longitudinal axis X and an inlet 26. The lower portion of the bin 22 defines a dirt collecting region 28 in which dirt separated from an incoming air flow accumulates. An inlet duct 30 is disposed at the inlet 26 and is arranged to promote a rotational flow within the cyclonic separating chamber 24.

The bin 22 further comprises an end wall which forms a bin base 32 that is connected to the lower portion of the cylindrical outer wall 23 by a hinge 34 such that the bin base 32 can be moved between a closed position in which the bin base 32 retains dirt within the dirt collecting region 28 and an open position in which dirt is removable from the dirt collecting region 28. The bin base 32 together with the lower portion of the bin 22 define a first dirt collector for collecting dirt separated by the first cyclonic separating unit 18. The bin base 32 comprises a raised portion 35 which projects upwardly from the remainder of the base 32. The bin base 32 is held in the closed position by a catch 36. In the embodiment shown, the catch 36 comprises a sprung clip formed integrally with the bin base 32. The catch 36 latches on a retaining feature 38 provided on the lower outer surface of the bin 22.

The bin 22 further comprises an actuator 39 in the form of a push rod that is held captive within channels on the side of the bin 22 such that it can move up and down (parallel to the outer wall 23 of the bin 22) between a first (un-deployed) position and a second (deployed) position. When the bin base 32 is in the closed position, movement of the actuator 39 from the first position into the second position forces a lower edge of the actuator 39 between the catch 36 and the retaining feature 38 in order to release the catch 36 and brings an adjacent abutting portion of the actuator 39 into contact with the bin base 32 thereby forcing the bin base 32 out of the closed position.

A tubular screen 40 is disposed within the cyclonic separating chamber 24. The tubular screen 40 forms a shroud that extends coaxially with the longitudinal axis X of the cyclonic separating chamber 24. The screen 40 comprises a rigid perforated plate, for example a metal plate. The perforations provide a fluid outlet from the cyclonic separating chamber 24.

An annular wipe 42 is secured to an upper peripheral edge of the cylindrical bin 22. The annular wipe 42 comprises a frusto-conical ring of elastomeric material that projects inwardly and downwardly from the upper edge of the bin 22 and contacts the outer surface of the tubular screen 40.

The second cyclonic separating unit 20 comprises a plurality of second cyclones 44, an outer wall arranged to form a hollow lower portion 46 disposed beneath solids outlets of the second cyclones 44, a pre-motor filter 48 disposed downstream of the second cyclones 44 between the cyclones 44, and an outlet duct 50 which extends between two adjacent cyclones rearwardly to a motor inlet 52 provided in the upper portion 12 of the main body 4.

The hollow lower portion 46 extends downwardly within the tubular screen 40. An inlet duct 54, defined in part between the hollow lower portion 46 and the tubular screen 40 and in part by outer walls of the second cyclones 44 extends upwardly from the fluid outlet from the cyclonic separating chamber 24 (provided by the perforations of the screen 40) to the inlets of the second cyclones 44. The tubular screen 40 and the hollow lower portion 46 are joined together at the top and also at the bottom, by an end wall 55, of the tubular screen 40 to form an integrated unit.

The hollow lower portion 46 comprises an annular end section 56 made of an elastomeric material. The end section 56 engages with, and forms a seal against, the raised portion 35 of the bin base 32 such that the bin base 32 and the hollow lower portion 46 together define a second dirt collector for collecting dirt separated by the second separating unit 20.

Figure 4:
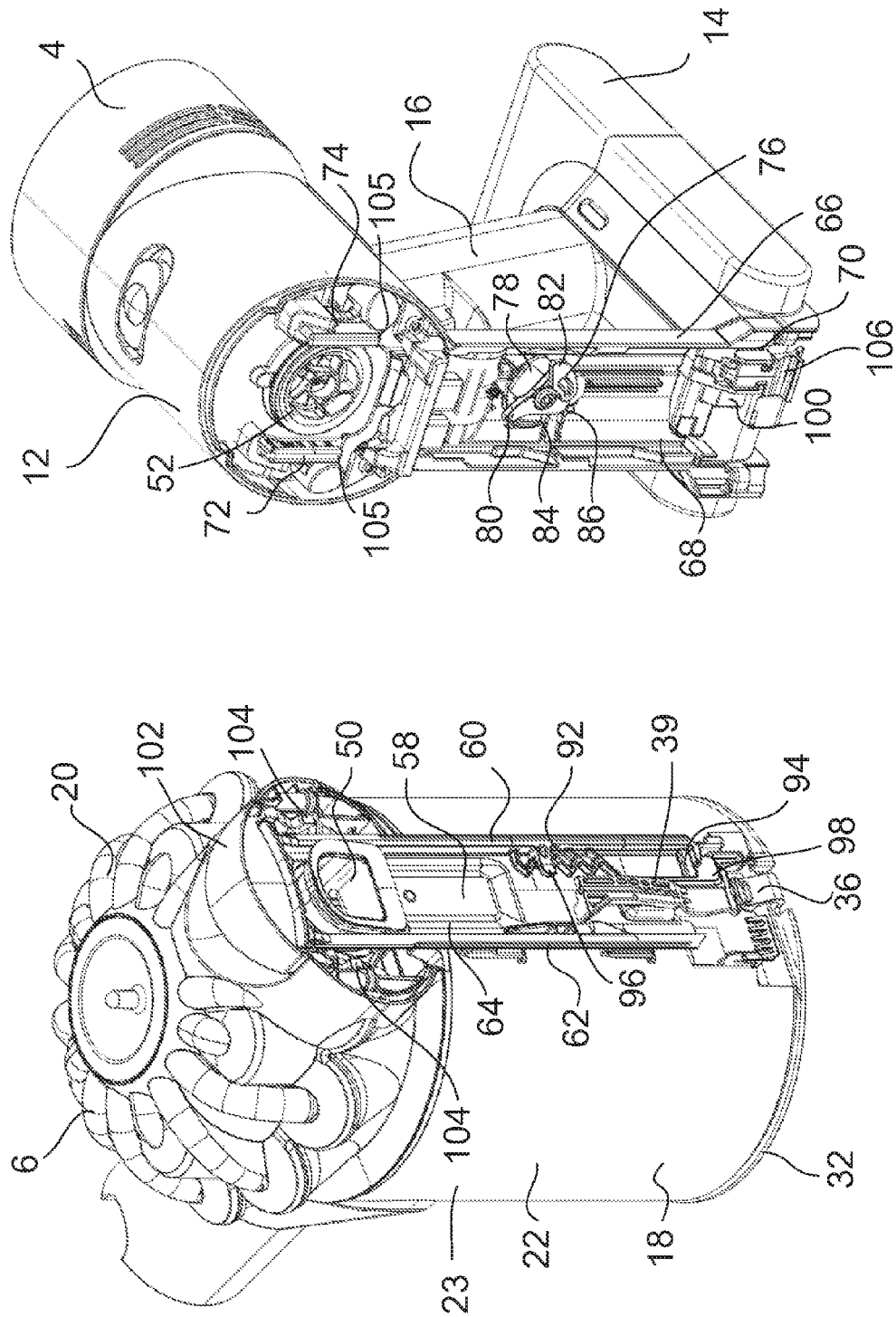
FIG. 4 shows the main body and the cyclonic separating apparatus shown in FIG. 2 separated from each other.

As shown in FIG. 4, the second cyclonic separating unit 20 comprises a slider 58 that extends downwardly from the region of the second cyclonic separating unit 20 adjacent the outlet duct 50. The slider 58 comprises first and second rails 60, 62 on opposite sides of the slider 58 which define a channel 64 extending between the rails 60, 62.

The main body 4 comprises a mounting portion 66 that extends from the upper portion 12 to the lower portion 14 of the main body 4. The mounting portion 66 has a pair of opposed grooves 68, 70 which slidably receive the first and second rails 60, 62. A second pair of grooves 72, 74 is provided on the end face of the upper portion 12 of the main body, one on each side of the motor inlet 52. The second pair of grooves 72, 74 slidably receives the respective upper portions of the rails 60, 62. The second cyclonic separating unit 20 can therefore slide up and down relative to the main body 4 and the dirt bin 22.

An actuating element 76 is mounted to the mounting portion 66 and arranged to rotate with respect to the mounting portion 66 about an axis that is orthogonal to the direction of motion of the slider 58 which, in the case of the present embodiment, is orthogonal to the longitudinal axis X of the cyclonic separating chamber 24.

Figure 5:
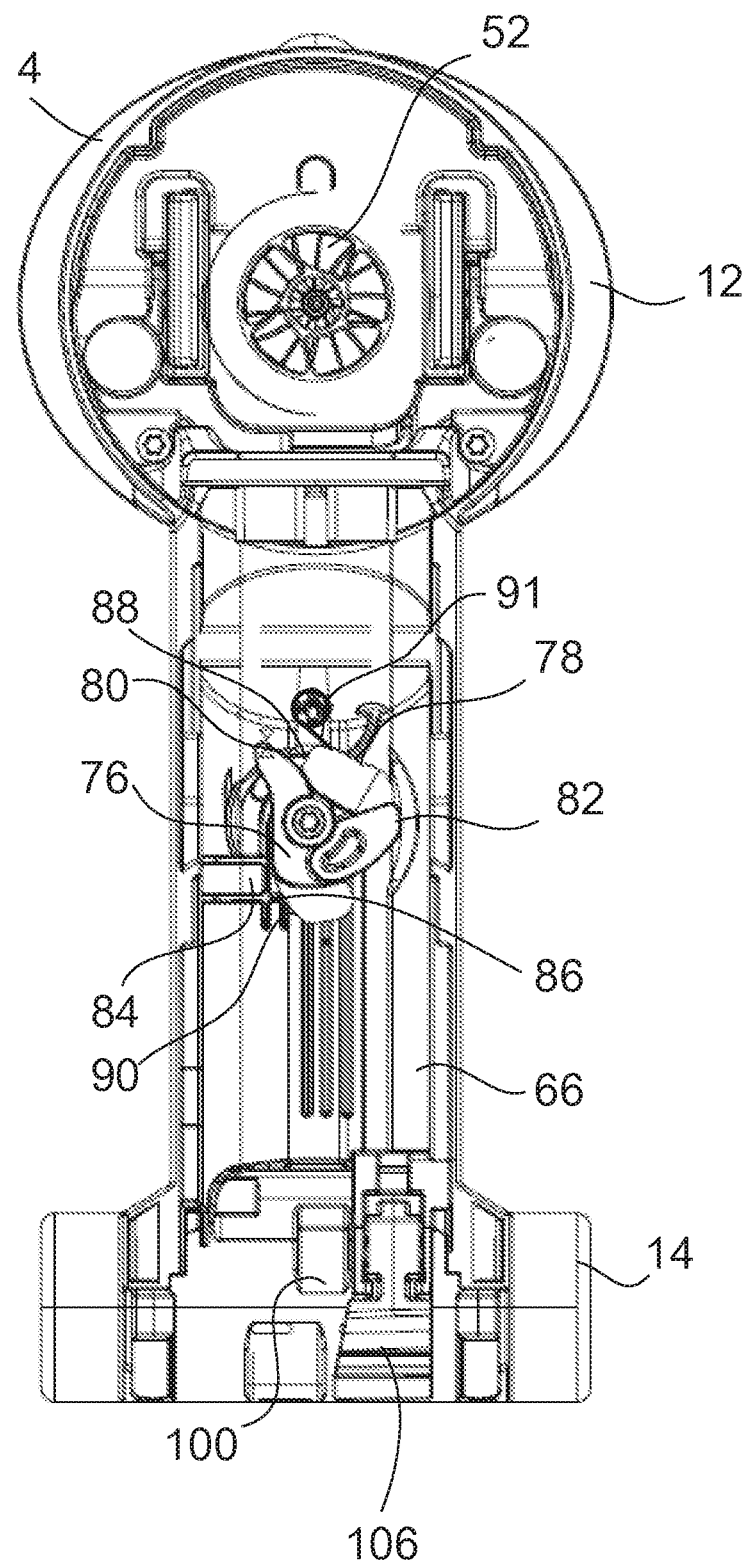
FIG. 5 shows a front view of the main body shown in FIG. 4.
Figure 7:
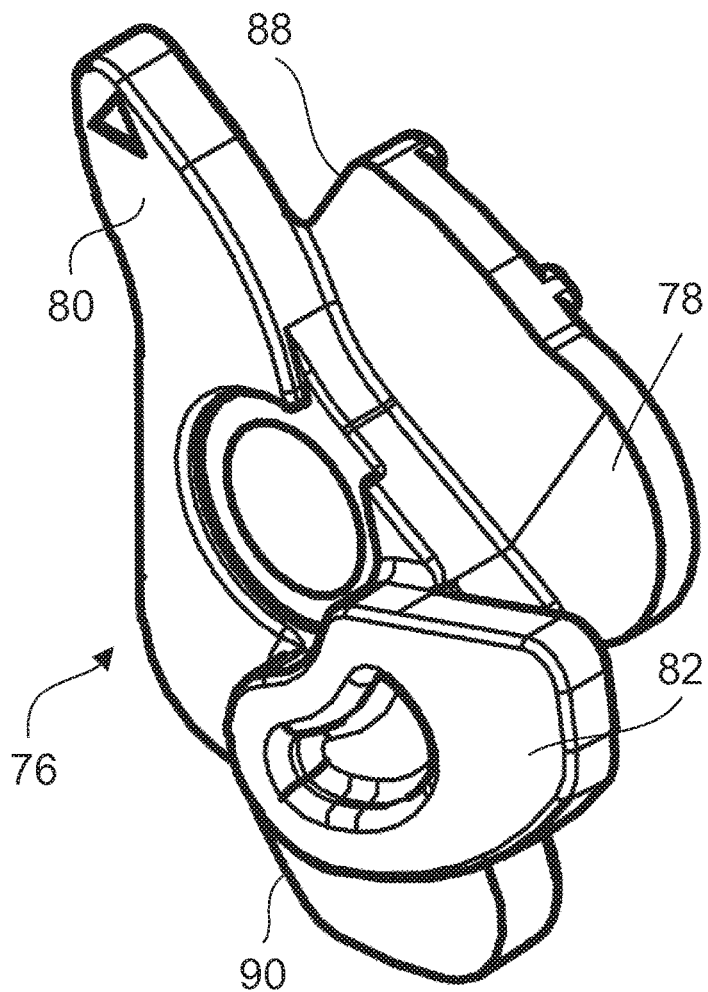
FIG. 7 shows an actuating element.

As shown in FIGS. 5 and 7, the actuating element 76 has three lobed formations 78, 80, 82; these are a limit-stop formation 78, a ratchet override formation 80 and a ratchet formation 82, which, as can be seen in FIG. 7, extend in respective parallel planes that are spaced along the rotational axis of the actuating element 76.

The actuating element 76 is arranged such that the limit-stop formation 78 is adjacent the mounting portion 76 and the ratchet formation 82 is spaced furthest from the mounting portion 76.

The mounting portion 66 has a first pivot stop 84 and a second pivot stop 86. The first pivot stop 84 is arranged such that rotation of the actuating element 76 in an anti-clockwise direction (as shown in FIG. 5) brings a first abutment surface 88 of the limit-stop formation 78 into contact with the first pivot stop 84 thereby preventing further rotation in the anticlockwise direction.

The second pivot stop 86 is arranged such that rotation of the actuating element 76 in a clockwise direction (as shown in FIG. 5) brings a second abutment surface 90 of the limit-stop formation 78 into contact with the second pivot stop 86 thereby preventing further rotation in the clockwise direction.

The actuating element 76 can therefore be rotated between a first position in which the first abutment surface 88 is in contact with the first pivot stop 84 and a second position in which the second abutment surface 90 is in contact with the second pivot stop 86. An over-centre spring 91 (shown in FIG. 5 only) is arranged between the mounting portion 66 and the actuating element 76 such that, when the actuating element 76 is in the first position, the spring 91 urges the actuating element 76 into the first position, and when the actuating element 76 is in the second position, the spring 91 urges the actuating element 76 into the second position.

Returning to FIG. 4, the slider 58 of the second cyclonic separating unit 20 further comprises a ridged formation 92 along the inside of the first rail 60. The ridged formation 92 is positioned along the first rail 60 such that, when the main body 4 and the cyclonic separating apparatus 6 are secured together, the ridged formation 92 extends in the same plane as the ratchet formation 82 of the actuating element 76. The ratchet formation 82 has a pointed tip, which in the embodiment shown is V-shaped. When the actuating element 76 is in the first position the tip of the ratchet formation 82 is above the ridged formation 92. The profile of the tip corresponds to the profile formed by adjacent ridges of the ridged formation 92 such that as the slider 58 moves upwardly within the first and second grooves 68, 70, the tip of the ratchet formation 82 moves between adjacent ridges of the ridged formation 92 causing the actuating element 76 to oscillate about its rotational axis.

In addition to the ridged formation 92, the slider 58 has a ratchet disengagement formation 94 at the lower end of the first rail 60 and a ratchet reset formation 96 positioned immediately below the uppermost ridge of the ridged formation 92. The ratchet disengagement formation 94 and the ratchet reset formation 96 are arranged such that, when the main body 4 and the cyclonic separating apparatus 6 are secured together, both the ratchet reset and ratchet release formations 94, 96 extend in the same plane as the ratchet override formation 80 of the actuating element 76.

A trigger device 98 in the form of a magnet (not visible) is secured to the lower end of the slider 58 facing a sensor 100, comprising a reed switch (not visible) which is disposed within the lower portion 14 of the main body 4. The sensor 100 forms part of a control system which is configured to permit operation of the vacuum cleaner when the sensor 100 has been activated by the presence of the magnet 98 adjacent the sensor 100 and to prevent operation of the vacuum cleaner 2 when the magnet 98 is out of range of the sensor 100.

The second cyclonic separating unit 20 further comprises a separator release catch 102 which is pivotally mounted at the rear of the of the second cyclonic separating unit 20. The separator release catch 102 has retaining features 104 which latch on latching features 105 provided on the upper portion 12 of the main body 4 in order to prevent the second cyclonic separating unit 20 from being pulled upwardly with respect to the main body 4.

A bin release catch 106 is secured at the bottom of the mounting portion 66 of the main body 4. The bin release catch 106 is cantilevered with respect to the bin 22 and arranged to engage a lower edge of the bin 22 in order to secure the bin 22 to the main body 4. The bin release catch 106 can therefore be flexed into and out of engagement with the bin 22.

In use, dirty air is drawn through the vacuum cleaner 2 by the motor and fan unit 13. Dirt separated by the first cyclonic separating unit 18 accumulates within the first dirt collector formed by the bin base 32 and the lower portion of the bin 22. Dirt separated by the second cyclonic separating unit 20 accumulates within the second dirt collector formed by the raised portion 35 of the bin base 32 and the hollow lower portion 46.

In order to remove the accumulated dirt from the vacuum cleaner 2 an operator first grips the handle 16 with one hand and then, using the other hand, pulls back on the separator release catch 102 towards the main body 4 causing it to pivot, thereby moving the retaining features 104 of the release catch 102 out of engagement with the latching features 105 of the main body 4.

The operator then pulls upwardly on the separator release catch 102 thereby drawing the second cyclonic separating unit 20 and the tubular screen 40 upwardly through the top of the bin 22. The seal between the second cyclonic separating unit 20 and the bin 22 is therefore broken. The seal between the elastomeric end section 56 of the hollow lower portion 46 and the raised portion 35 of the bin base 32 is also broken.

As the second cyclonic separating unit 20 is drawn upwardly, the dirt that has collected in the second dirt collector can spill out into the first dirt collector. Drawing the tubular screen 40 out of the bin increases the amount of space for dirt within the first dirt collector such that any debris that may have been trapped between the tubular screen 40 and the outer wall of the bin 22 can fall into the additional space created in the bottom of the first dirt. In addition, as the second cyclonic separating unit 20 is pulled upwardly the tubular screen 40 slides along the annular wipe 42 which is secured to the bin 22. The wipe 42 forces dirt and debris which may have clung to the screen 40, such as hair or threads, along the screen 40 and pushes the debris from the end of the screen 40 into the first dirt collector. The combination of the tubular screen 40 being drawn from the bin 22 and cleaning of the tubular screen 40 by the annular wipe 42 greatly improves the removal of debris that has become stuck in the cyclonic separating chamber 24 defined by the upper portion of the bin 22.

Once the operator has broken the seal between the second cyclonic separating unit 20 and the bin 22 and the seal between the elastomeric end section 56 of the hollow lower portion 46, it is undesirable for the second cyclonic separating unit 20 to be pushed back down into the bin 22 until after the bin 22 has been emptied. This is because debris can become trapped between the elastomeric end section 56 and the bin base 32, thereby preventing a seal from reforming and thus adversely affecting the separation efficiency of the separating apparatus 6. A further consequence of pushing the second cyclonic separating unit 20 back into the bin 22 while the bin 22 contains dirt is that air and debris would be forced out of the top of the bin 22 through the gap between the second cyclonic separating unit 20 and the top of the bin 22 as the second cyclonic separating unit 20 is pushed back. This can cause the operator to be soiled as dirt is ejected from the top of the bin 22, which is undesirable.

Figure 6A:
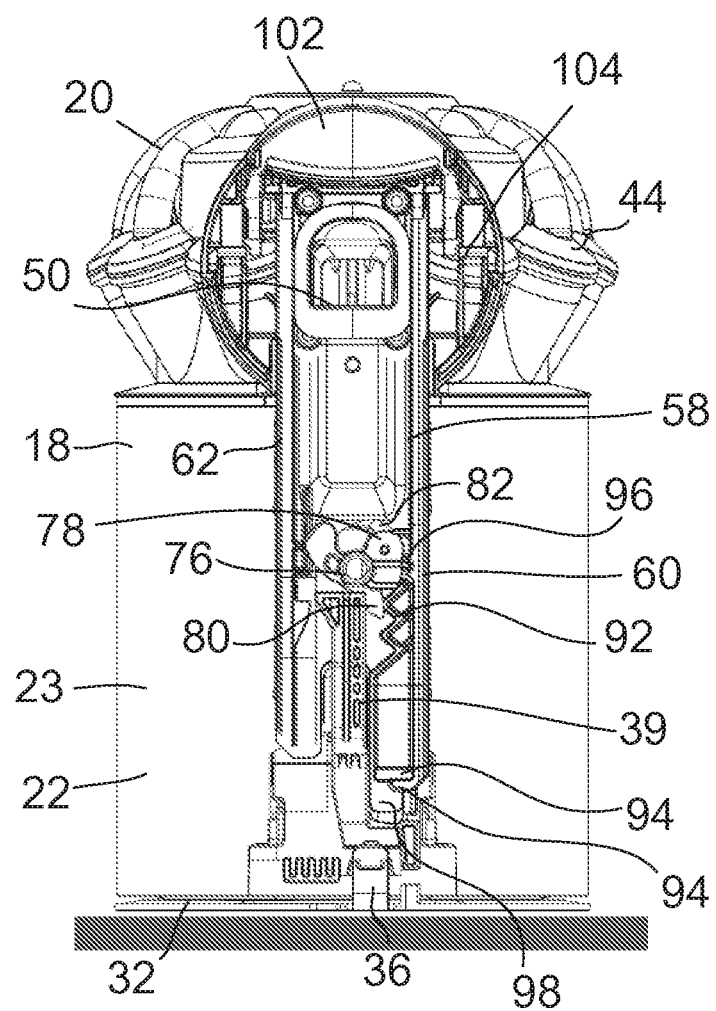
FIG. 6A shows a rear view of parts of the main body and the cyclonic separating apparatus shown in FIG. 2 in a first configuration.
Figure 6B:
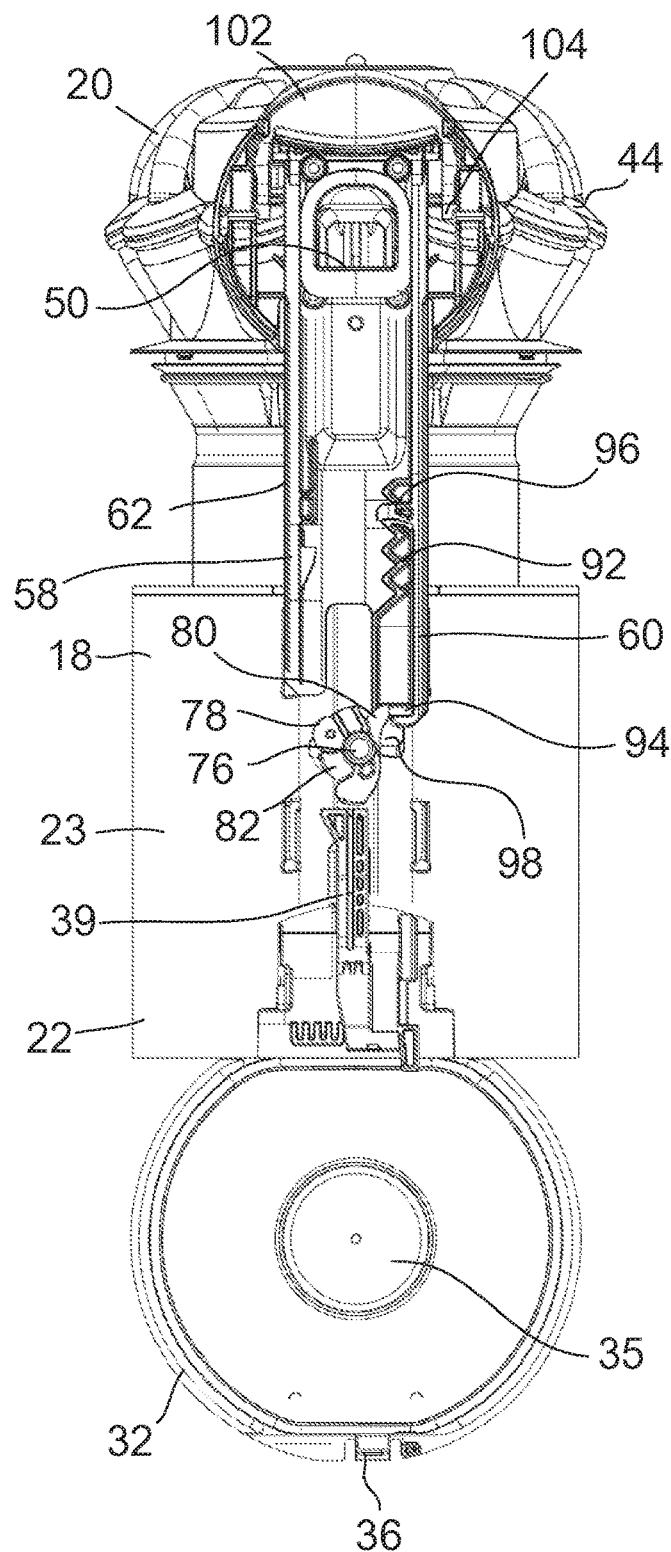
FIG. 6B shows a rear view of parts of the main body and the cyclonic separating apparatus shown in FIG. 2 in a second configuration.

FIGS. 6A and 6B show a selection of elements of the main body 4 and the cyclonic separating apparatus 6 in order to aid explanation of the interaction between the slider 58, the actuating element 76 and actuator 39 on the bin 22. FIG. 6A shows the cyclonic separating apparatus 6 in the configuration prior to the use pulling upwardly on the separator release catch 102.

As the slider 58 moves upwardly from the configuration shown in FIG. 6A, the top ridge of the ridged formation 92 is brought into contact with the ratchet formation 82 and pushes upwardly against the tip of the ratchet formation 82 causing the actuating element 76 to rotate in the anticlockwise direction (as viewed in FIG. 6A). The top ridge can therefore push past the tip of the ratchet formation 82 as the ratchet formation 82 moves away. Once the top ridge has cleared the tip, the spring 91 urges the actuating element 76 back in the clockwise direction thus bringing the tip into engagement with the ridge immediately below the top ridge. This repeats for each ridge as the slider 58 moves upwardly. Should the operator attempt to push the second cyclonic separating unit 20 back into the bin 22 while the ratchet formation 82 is in engagement with the ridged formation 92, the contact between the first abutment surface 88 of the limit-stop formation 78 and the first pivot stop 84 prevents the actuating element 76 from rotating clockwise (as viewed in FIG. 6A) and so prevents the ridges of the ridged formation 92 from pushing past the tip of the ratchet formation 82. The ridged formation 92 and the ratchet formation 82 therefore form a detent mechanism in the form of a ratchet which prevents the second cyclonic separating unit 20 from being pushed back into the bin 22 once the bin emptying process has begun.

One the ridged formation 92 has cleared the ratchet formation 82, further upward motion of the second cyclonic separating unit 20 brings the ratchet disengagement formation 94 into contact with the tip of the ratchet override formation 80. As the ratchet disengagement formation 94 is drawn past the actuating element 76, the ratchet disengagement formation 94 pushes upwardly against the ratchet override formation 80 causing the actuating element 76 to rotate anticlockwise. The length of the ratchet override formation 80 is such that the angle through which the actuating element 76 rotates is much greater than the angle through which the actuating element was rotated by engagement between the ridged formation 92 and the ratchet formation 82. At the same time, a lobe of the limit-stop formation 78 is brought into contact with the top of the actuator 39 for releasing the catch 36 of the bin 22 and so provides a cam which presses down on the bin actuator 39 thereby releasing the catch 36 and opening the bin base 32, as shown in FIG. 6B. Rotation of the actuating element 76 by the ratchet disengagement formation 94 rotates the actuating element 76 through the over-centre point for the spring 91. The actuating element 76 is therefore held in the second position by the spring 91 and the lobe of the limit-stop formation 78 prevents the operator from closing the bin base 32.

In order to close the bin base 32, the operator must first push the second cyclonic separating unit 20 together with the tubular screen 40 back into the bin 22 so that a seal is formed again between the bin 22 and the second cyclonic separating unit 20. In doing so, the ratchet reset formation 96 of the slider 58 is pushed downwardly against the ratchet override formation 80 of the actuating element 76 thereby rotating the actuating element 76 clockwise back into the first position. The lobe of the limit-stop formation 78 which prevented the operator from closing the bin base 32 is therefore moved away from the top of the actuator 39 allowing the user to close the bin base 32.

A benefit of the arrangement is that once the emptying process has been initiated, an operator must complete the process by opening the bin base 22 and then push the second cyclonic separating unit 20 back into the bin 22 before the bin base 22 can be closed again. This makes it very difficult for an operator to partially remove the second cyclonic separating unit 20 from the bin 22 and then push it back into the bin 22 while debris is still in the bin 22. It also makes it difficult for an operator to assemble the vacuum cleaner in a state in which the bin base 32 is closed and then pushing the second cyclonic separating unit 20 into the bin 22, thereby preventing the operator from being soiled by ejected debris.

It will be appreciated that, as the second cyclonic separating unit 20 is drawn out of the bin 22 and away from the main body 4 the outlet duct 50 and the motor inlet 52 are moved out of alignment with each other. If the vacuum cleaner 2 were to be activated, there is a risk that debris could bypass the cyclonic separating apparatus 6 and be drawn directly into the motor, which could damage the motor. However, since the magnet is moved out of registration with the sensor 100 as the second cyclonic separating unit 20 is moved upwardly, the vacuum cleaner 2 is disabled and so the operator cannot inadvertently operate the vacuum cleaner 2. This provides a safeguard against accidental operation of the vacuum cleaner 2 while the motor inlet 52 is exposed.

Figure 8:
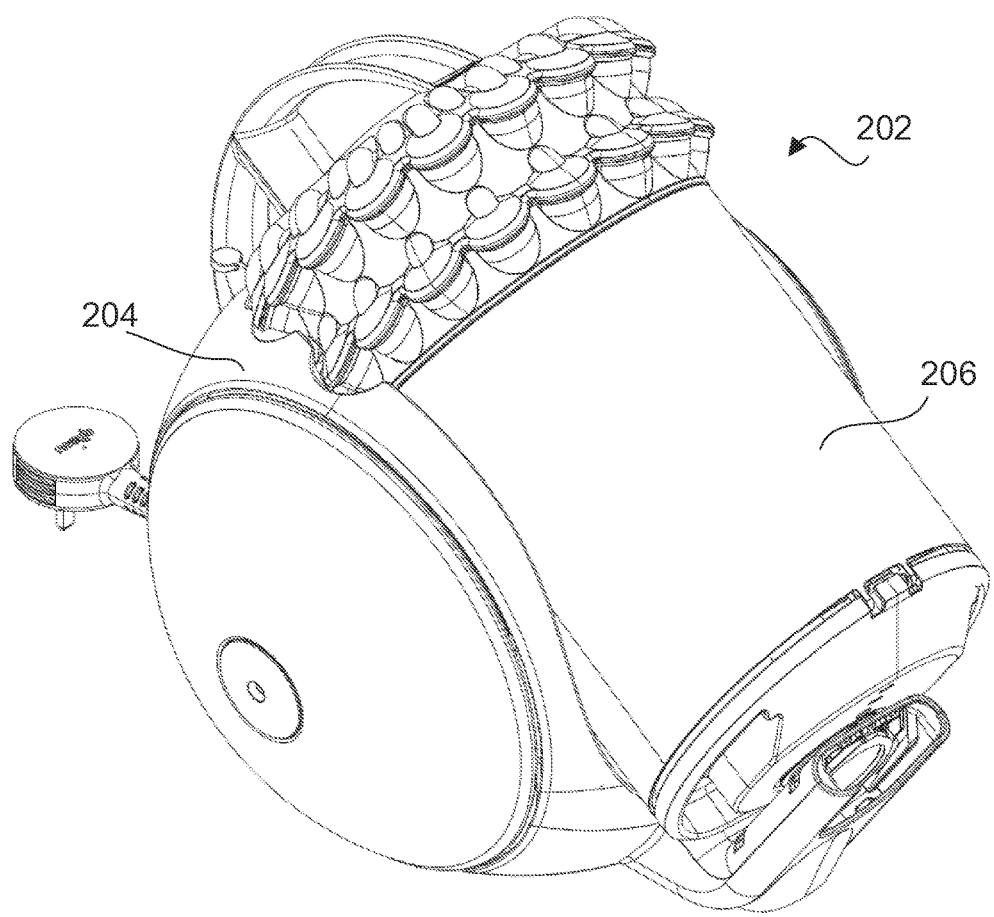
FIG. 8 shows a second embodiment of a vacuum cleaner.

FIG. 8 shows a cylinder vacuum cleaner 202 comprising a main body 204 and a cyclonic separating apparatus 206 which is detachably mounted to the main body 204.

Figure 9:
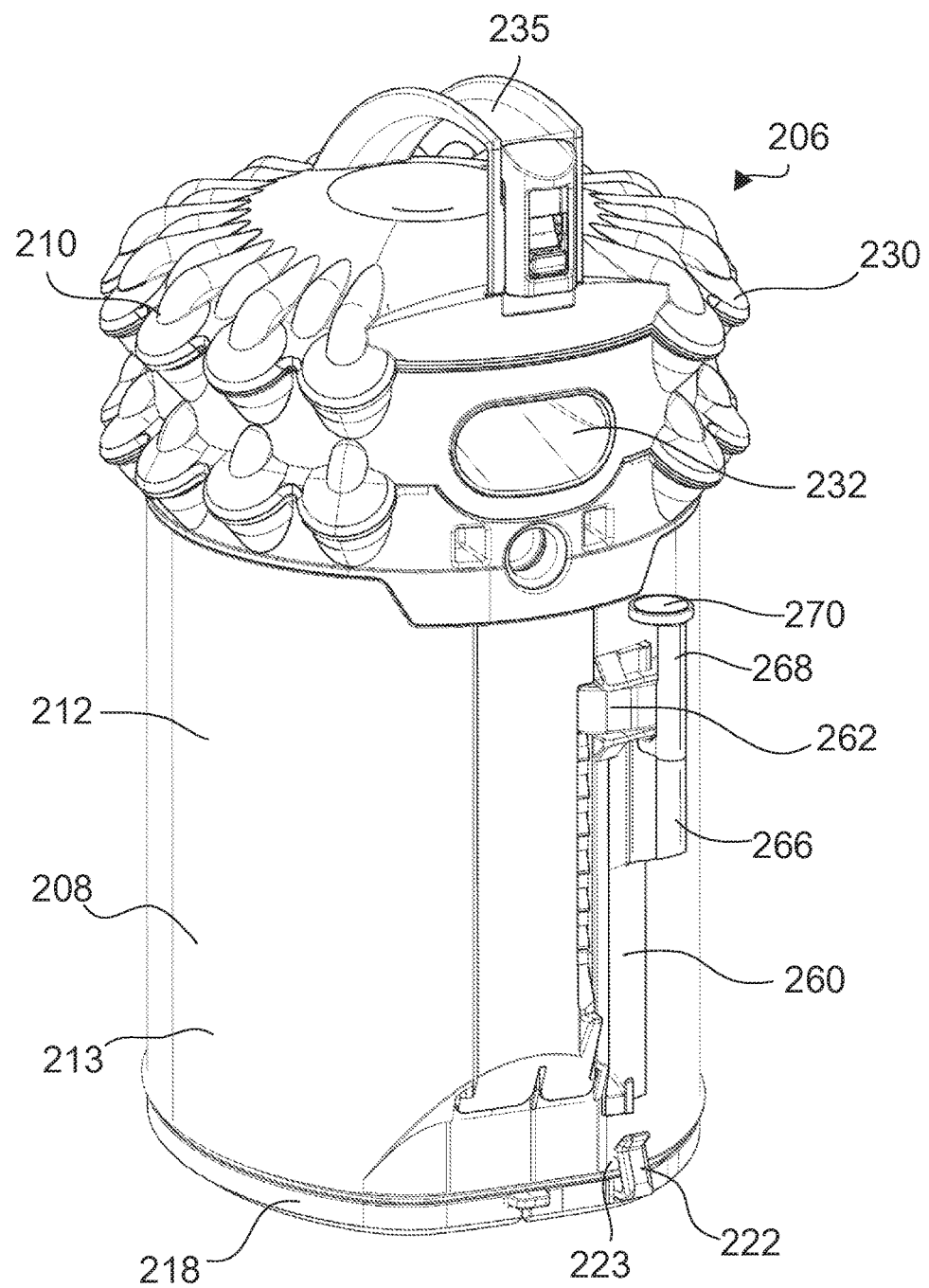
FIG. 9 shows a cyclonic separating apparatus of the vacuum cleaner shown in FIG. 8.
Figure 10:
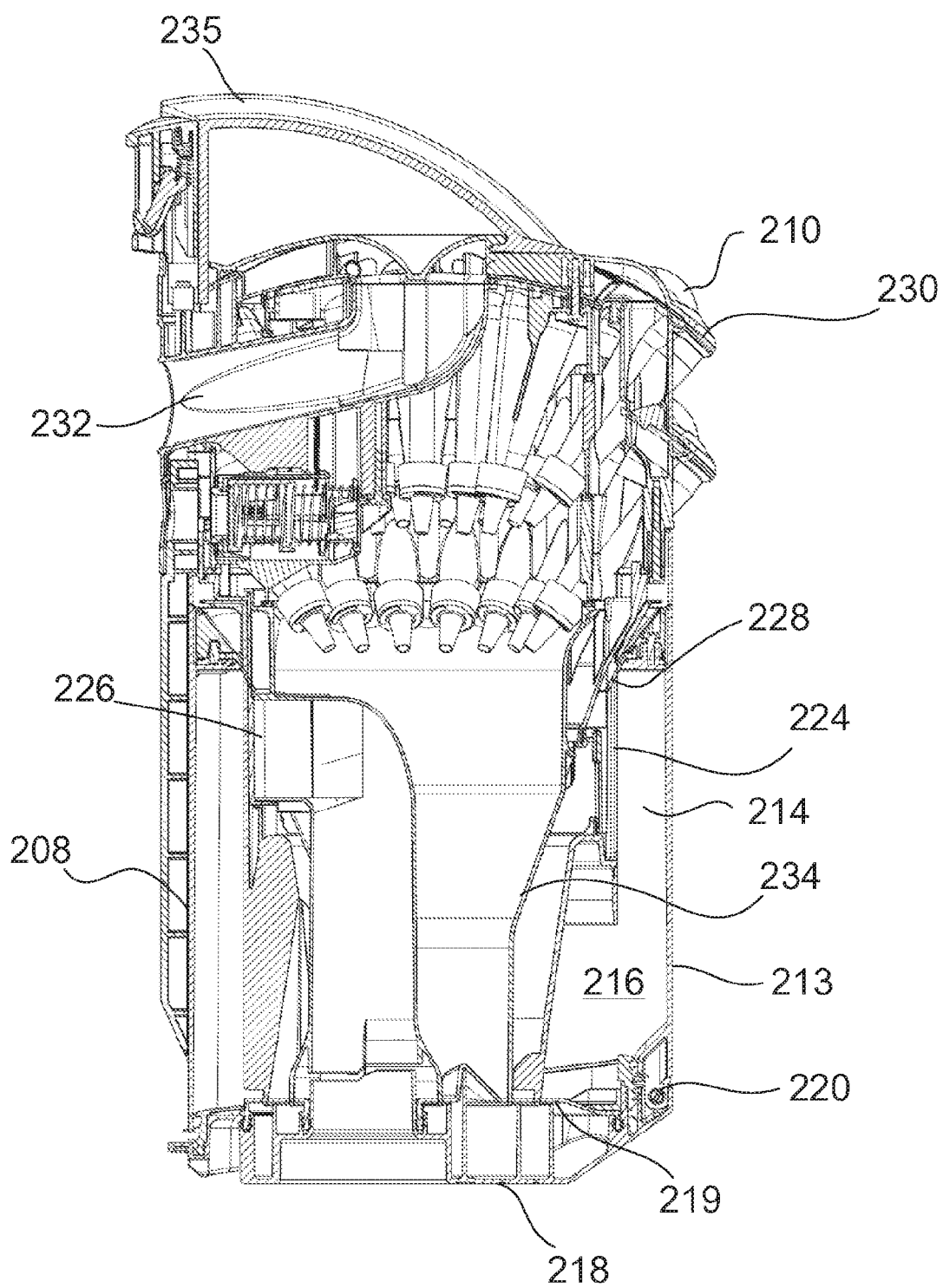
FIG. 10 is a cross-sectional view of the cyclonic separating apparatus shown in FIG. 9.

FIGS. 9 and 10 shows the cyclonic separating apparatus 206 in isolation. The cyclonic separating apparatus 206 comprises a first cyclonic separating unit 208 and a second cyclonic separating unit 210. The first and second cyclonic separating units 208, 210 have a construction that is similar to that of the first and second cyclonic separating units 18, 20 of the vacuum cleaner shown in FIG. 1. The first cyclonic separating unit 208 therefore comprises a bin 212 having a cylindrical outer wall 213 that defines a cyclonic separating chamber 214 and a first dirt collecting region 216, and a bin base 218 connected to the outer wall 213 by a hinge 220 and held in a closed position by a bin release catch 222 which latches on a retaining feature 223 provided on the lower outer surface of the bin 212. The bin base 218 comprises a diaphragm 219 of resilient material such as an elastomeric material. The lower portion of the outer wall 213 and the bin base 218 together define a first dirt collector for collecting dirt separated by the first cyclonic separating unit 208. A tubular screen 224 is disposed within the cyclonic separating chamber 214 and an inlet 226 for the separating chamber 214 is provided through the tubular screen 224 and opens radially outwardly into the chamber 214. An annular wipe 228 comprising a ring of elastomeric material is secured to an upper portion of the bin 212.

The second cyclonic separating unit 210 comprises a plurality of second cyclones 230 downstream of the first cyclonic separating unit 208, a pre-motor filter (not shown) and an outlet duct 232 that extends rearwardly between two adjacent cyclones. A hollow lower portion 234 is disposed beneath the solids outlets of the second cyclones 230 and extends downwardly within the tubular screen 224. The hollow lower portion 234 and the diaphragm 219 of the bin base 218 together define a second dirt collector for collecting dirt separated by the second cyclonic separating unit 210. A handle 235 is provided at the top of the second cyclonic separating unit 210 by which the second cyclonic separating unit 210 can be removed from the main body 204 and carried.

Figure 11:
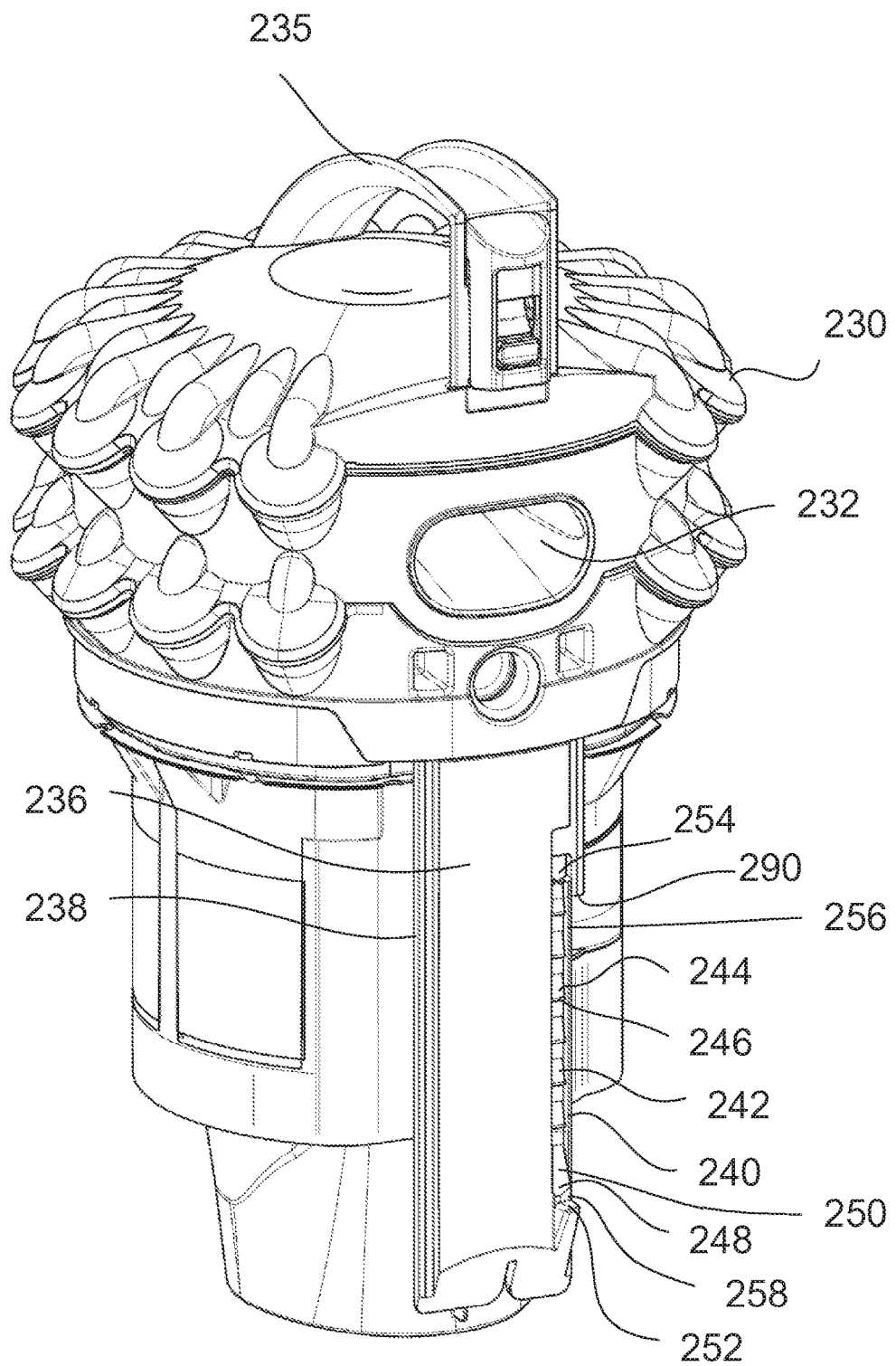
FIG. 11 shows a first part of the cyclonic separating apparatus shown in FIG. 9.
Figure 12:
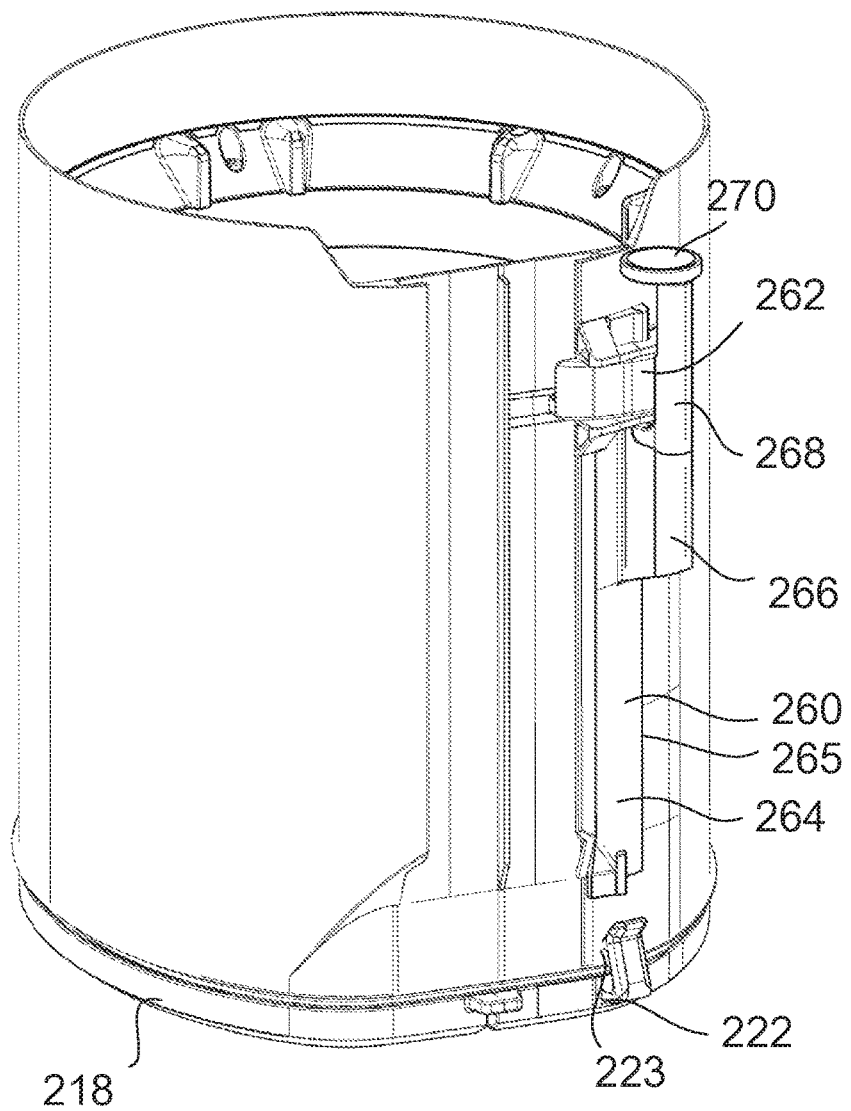
FIG. 12 shows a second part of the cyclonic separating apparatus shown in FIG. 9.

Referring to FIG. 11, the second cyclonic separating unit 210 further comprises a slider 236 which extends downwardly from a region of the second cyclonic separating unit 210 below the outlet duct 232. The slider 236 comprises first and second rails 238, 240 that extend along the sides of the slider 236. The slider 236 has a ridged formation 242 that extends along a mid portion of the slider 236 adjacent the second rail 240. The ridged formation 242 has a plurality of ridges, six in the embodiment shown, each ridge having an inclined upper surface 244 that extends downwardly and away from the slider 236 and a lower surface 246 that extends perpendicularly to the longitudinal direction of the slider 236. A final lowermost ridge 248 is provided below the ridged formation 242. The lowermost ridge 248 also has an upper surface 250 that is inclined downwardly away from the slider 236. The maximum height of the lowermost ridge 248 is greater than the maximum height of the ridges of the ridged formation 242. A catch stop formation 252 is provided at the bottom of the lowermost ridge 248. A stop aperture 254, in the shape of a square, is provided through the slider 236 immediately above the rail formation 242. A shield formation 256 extends from the stop aperture 254 to the catch stop formation 252 alongside the ridged formation 242. A gap 258 is provided in the shield formation adjacent the lowermost ridge 248.

Figure 13:
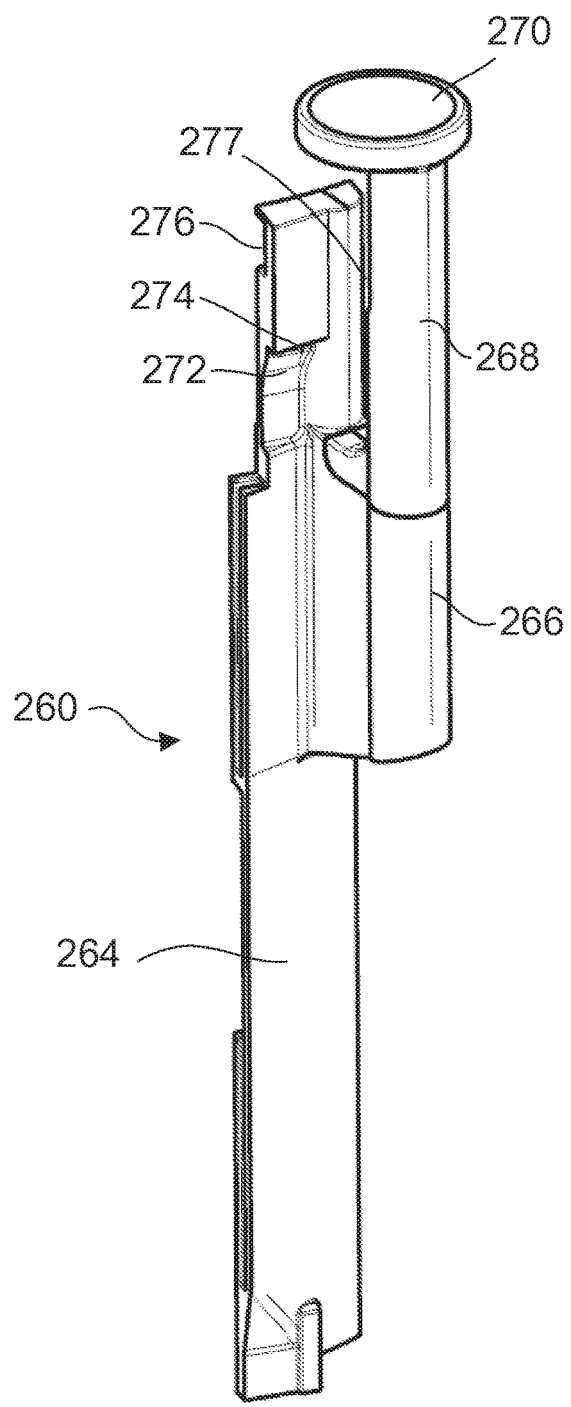
FIG. 13 shows part of an actuator of the cyclonic separating apparatus shown in FIG. 9.
Figure 14:
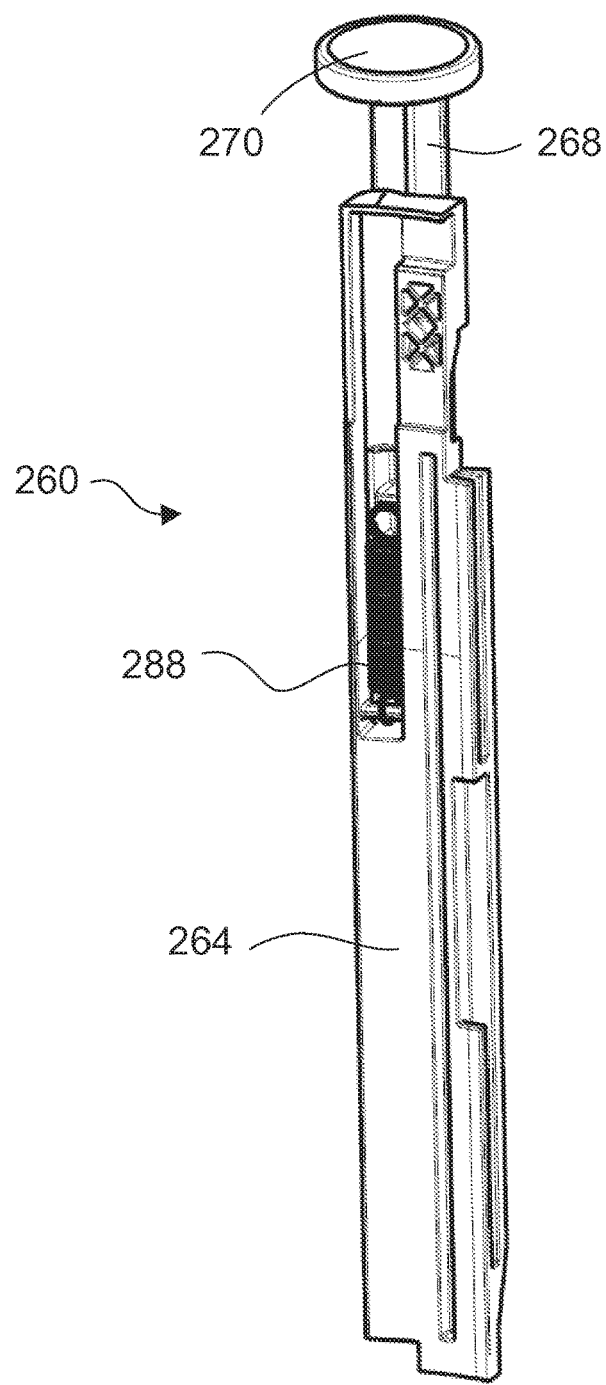
FIG. 14 shows part of the actuator shown in FIG. 13 from an alternative perspective.
Figure 15:
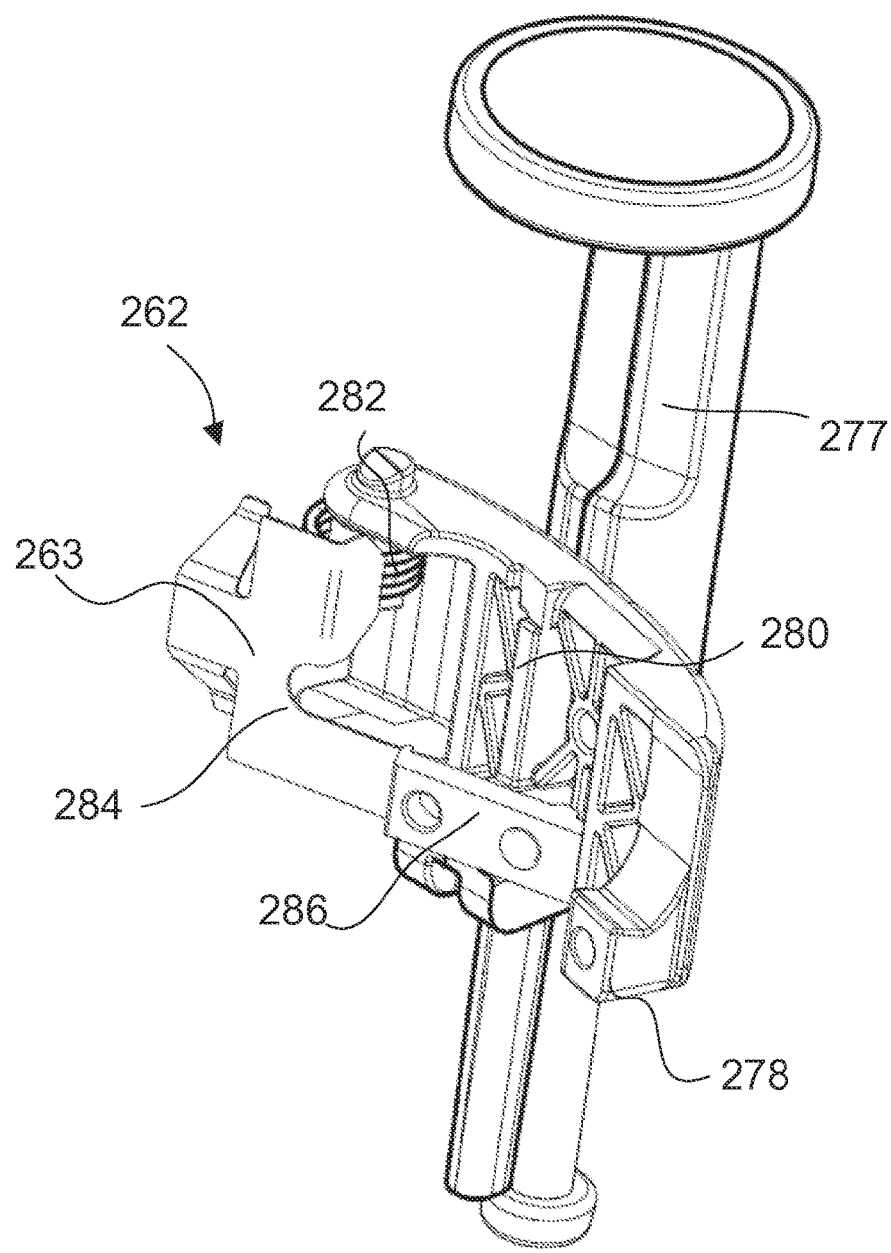
FIG. 15 shows a region of cyclonic separating apparatus shown in FIG. 9 incorporating a catch.

Referring to FIGS. 12 to 15, the bin 212 is provided with an actuator 260, a bin retaining catch 262 and a latching element 263 (shown in FIG. 15). The actuator 260 is in the form of a push rod that is held captive of the side of the bin 212 in a groove 265 such that the actuator 260 can move up and down (i.e. parallel to the outer wall 213 of the bin 212) between a first (un-deployed) position and a second (deployed) position. When the bin base 218 is in the closed position, movement of the actuator 260 from the first position into the second position forces a lower edge of the actuator 260 between the catch 222 and the retaining feature 223 in order to release the catch 222.

Referring to FIGS. 13 and 14, which show the actuator 260 in isolation, the actuator 260 comprises an elongate actuating portion 264, a connecting portion 266 that joins the elongate actuating portion 264, a guard portion 268 that extends upwardly from the connecting portion 264 and a pressing portion 270 in the form of a push-button that is disposed on top of the guard portion 268.

The actuating portion 264 comprises a catch release formation 272 on the side of the actuating portion 264 that faces away from the bin 212. The catch release formation 272 has a surface that extends downwardly towards the bin 212. The actuating portion 264 further comprises a stop formation 274 immediately above the catch release formation 272. The stop formation 274 has a lower surface that extends orthogonally with respect to the direction of motion of the actuator 260. The actuating portion 264 further comprises a retention formation 276 in the form of a recess on the surface of the actuating portion 264 that faces the bin 212. The retention formation 276 is disposed above the catch release formation 272 and the stop formation 274.

The guard portion 268 has a recess 277 on the underside of the guard portion 268 immediately below the pressing portion 270.

The bin retaining catch 262 is pivotally connected to the cylindrical outer wall 213 of the bin 212. Referring to FIG. 15, the bin retaining catch 262 comprises a first protrusion 278 at the end of the catch 262 furthest from the pivot. The first protrusion 278 is provided on the underside of the bin retaining catch 262 and projects inwardly towards the outer wall of the bin 212. A second protrusion 280 is positioned midway along the bin retaining catch 262. The second protrusion 280 also projects inwardly towards the outer wall of the bin 212. A torsion spring 282 is arranged between the outer wall 213 of the bin 212 and the bin retaining catch 262 such that the bin retaining catch 262 is biased towards the outer wall 213 of the bin 212.

The latching element 263 comprises a leaf spring 284 that is fixed at one end to the outer wall of the bin 212 and an actuator engaging element 286 is fixed to the other end of the leaf spring 284. The latching element 263 is arranged such that the actuator engaging element 286 is biased outwardly away from the outer wall of the bin 212.

With reference to FIG. 14 which shows the actuator 260 shown in FIG. 13 from an alternative perspective, a tension spring 288 is disposed within a recess on the underside of the actuator 260. One end of the tension spring 288 is connected to the outer wall of the bin 212 and the other end of the tension spring 288 is connected to the actuator 260 such that the actuator 260 is biased upwardly into the first position.

In order to remove accumulated dirt from the first and second dirt collectors, an operator grips the handle 235 with one hand and pushes downwardly on the pressing portion 270 of the actuator 260 with the other. Prior to being pressed, the actuator 260 is held in the first position by the tension spring 288 which urges the top of the actuating portion 264 into abutting engagement with an upper end surface of the groove 265 on the bin 212. In the first position, the first protrusion 278 on the underside of the bin retaining catch 262 is located in the stop aperture 254 through the slider 236 and so prevents the bin 212 from moving relative to the slider 236 and hence the second cyclonic separating unit 210.

The second protrusion 280 on the underside of the bin retaining catch 262 is positioned immediately below the catch release formation 272 (see FIG. 13). Therefore, as the actuator 260 is pushed downwardly with respect to the bin 212, the release catch formation 272 slides underneath the second protrusion 280 such that the second protrusion 280 rides up the release catch formation 272 into contact with the stop formation 274 of the actuator 260. This causes the bin retaining catch 262 to pivot with respect to the outer wall of the bin 212 thereby moving the first protrusion 278 out of engagement with the stop aperture 254 and releasing the bin 212 for movement relative to the slider 236. The stop formation 274 prevents the actuator 260 from moving further relative to the bin 212. Therefore, as the operator pushes down on the actuator 260 the bin 212 slides along the slider 236. The first protrusion 278 of the catch 262 rides along the inclined upper surfaces of the ridged formation 242 as the bin 212 moves downwardly. The lower surfaces 246 are perpendicular and so prevent movement in the opposite (upward) direction.

The ridged formation 242 and the bin retaining catch 262 therefore form a ratchet mechanism that permits downward motion of the bin 212 with respect to the slider 236, but prevents upward motion. This ensures that once the emptying process has begun, it is difficult for a user to replace the bin 212 before it is emptied. The advantages of this have been described above with respect to the vacuum cleaner shown in FIG. 1.

At the maximum distance of travel of the bin 212, the bin retaining catch 262 comes into contact with the catch stop formation 252 of the slider 236. As it does so, the first protrusion 278 on the bin retaining catch 262 rides up on the lowermost ridge 248. This pivots the end of the bin retaining catch 262 further out from the outer wall of the bin 212 lifting the second protrusion 280 out of engagement with the stop formation 274 of the actuator 260. The actuator 260 can therefore be pushed further downwardly relative to the bin 212 into the second position in order to force the end of the actuator 260 between the bin release catch 222 and the retaining feature 223 thereby releasing the bin release catch 222 so that the bin base 218 can be opened to empty the first and second dirt collectors. As the actuator 260 moves into the second position, the actuator engaging element 286 of the latching element 263 is urged by the leaf spring 284 into engagement with the retention formation 276 such that the actuator 260 is held by the latching element 263 in the second position. This prevents the bin base 222 from being returned to the closed position. Furthermore, the latching element 263 holds the catch in the raised position so that the bin 212 can be slid back along the slider 236 without the first protrusion 278 engaging the ridged formation 242.

When in the second position, the recess 277 in the guard portion 268 is positioned over the bin retaining catch 262. This provides space for the bin retaining catch 262 to be pivoted further away from the outer wall 213 of the bin 212 such that the end of the bin retaining catch 262 can be lifted over the catch stop formation 252 for complete removal of the bin 212 from the slider 236.

As the bin 212 is returned along the slider 236 to its original position, an edge 290 of the slider 236 forces the actuator engaging element 286 of the latching element 263 out of the retention formation 276 towards the outer wall 213. On release of the latching element 263, the tension spring 288 returns the actuator 266 to its first position. The cyclonic separating apparatus 206 can then be returned to the main body 204 for use.

The invention claimed is:

1. A vacuum cleaning apparatus comprising:
 a cyclonic separating unit comprising a cyclonic separator having a separator axis and an end wall that is openable for removal of dirt from the cyclonic separator;
 a screen disposed within the cyclonic separator such that it extends in the longitudinal direction of the cyclonic separator, wherein the cyclonic separator is movable relative to the screen between a first position and a second position in the longitudinal direction of the cyclonic separator;
 a catch arranged to secure the openable end wall in a closed position;
 an actuator that is actuable to release the catch; and
 a locking mechanism having a first configuration in which the locking mechanism engages the actuator to prevent actuation and a second configuration in which the locking mechanism is disengaged from the actuator such that the actuator can be actuated to release the catch, wherein the locking mechanism is arranged such that the locking mechanism is engaged with the actuator when the cyclonic separator is in the first position and the locking mechanism is disengaged from the actuator when the cyclonic separator is in the second position.

2. The vacuum cleaning apparatus of claim 1, wherein the locking mechanism comprises a second catch mounted on the cyclonic separating unit and arranged to pivot into and out of engagement with the actuator.

3. The vacuum cleaning apparatus of claim 2, wherein the vacuum cleaning apparatus comprises a slider that is configured to slide relative to the cyclonic separator when the cyclonic separator is moved between the first position and the second position, the slider comprising a formation that acts on the second catch to pivot the second catch out of engagement with the actuator as the cyclonic separator is moved into the second position.

4. A vacuum cleaner comprising:
 a first cyclonic separating unit comprising a cyclonic separator having a separator axis and an end wall which is openable for removal of dirt from the cyclonic separator;
 a second cyclonic separating unit located downstream of the first cyclonic separating unit;
 a screen disposed within the cyclonic separator such that it extends in the longitudinal direction of the cyclonic separator, wherein the cyclonic separator is movable relative to the screen between a first position and a second position in the longitudinal direction of the cyclonic separator;
 a catch arranged to secure the openable end wall in a closed position; and an actuator that is actuable to release the catch, wherein the actuator is arranged such that movement of the cyclonic separator into the second position actuates the actuator thereby releasing the catch.

5. The vacuum cleaner of claim 4, wherein the vacuum cleaner comprises a body and an actuating element rotatably connected to the body and arranged to rotate between a first position and a second position, and wherein the actuating element comprises an actuating portion that is brought into contact with the actuator when the cyclonic separator is moved into the second position thereby actuating the actuator.

6. The vacuum cleaner of claim 5, wherein the actuator is arranged to move relative to the cyclonic separator from a first position to a second position in order to release the catch, and the actuating portion of the actuating element acts against the actuator in order to move the actuator from the first position into the second position.

7. The vacuum cleaner of claim 5, further comprising a slider that is fixed for movement with the screen, wherein the slider is arranged to engage the actuating element such that movement of the cyclonic separator between the first position and the second position rotates the actuating element between the first and second positions of the actuating element.

8. The vacuum cleaner of claim 4, wherein the screen is tubular.

9. The vacuum cleaner of claim 8, wherein the cyclonic separator comprises a wipe that is arranged to wipe the screen when the cyclonic separator is moved from the first position into the second position.

10. The vacuum cleaner of claim 9, wherein the wipe is annular and surrounds at least part of the tubular screen.

11. The vacuum cleaner of claim 10, wherein the wipe has a frusto-conical shape.

12. The vacuum cleaner of claim 11, wherein the wipe is arranged such that the wipe tapers inwardly towards the screen and the lower inner peripheral edge of the wipe contacts the screen.

13. The vacuum cleaner of claim 9, wherein the screen extends in the longitudinal direction of the cyclonic separator and the screen has a lower edge which is spaced from the openable end wall when the openable end wall is in a closed position, and wherein movement of the cyclonic separator from the first position into the second position moves the lower inner peripheral edge of the wipe along the screen and over the lower edge of the screen such that debris is swept over the lower edge of the screen into the dirt collector.

14. The vacuum cleaner or vacuum cleaner of claim 9, wherein the cyclonic separating unit comprises a bin that forms an outer wall of the cyclonic separator.

15. The vacuum cleaner or vacuum cleaner of claim 14, where the wipe is attached to the bin.

16. The vacuum cleaner of claim 9, wherein the wipe comprises an elastomeric material.

17. The vacuum cleaning apparatus of claim 1, wherein the screen is tubular.

18. The vacuum cleaning apparatus of claim 17, wherein cyclonic separator comprises a wipe that is arranged to wipe the screen when the cyclonic separator is moved from the first position into the second position.

19. The vacuum cleaning apparatus of claim 18, wherein the wipe is annular and surrounds at least part of the tubular screen.

20. The vacuum cleaning apparatus of claim 19, wherein the wipe has a frusto-conical shape.

21. The vacuum cleaning apparatus of claim 20, the wipe is arranged such that the wipe tapers inwardly towards the screen and the lower inner peripheral edge of the wipe contacts the screen.

22. The vacuum cleaning apparatus of claim 18, wherein the screen extends in the longitudinal direction of the cyclonic separator and the screen has a lower edge that is spaced from the openable end wall when the openable end wall is in a closed position, and wherein movement of the cyclonic separator from the first position into the second position moves the lower inner peripheral edge of the wipe along the screen and over the lower edge of the screen such that debris is swept over the lower edge of the screen into the dirt collector.

23. The vacuum cleaning apparatus of claim 18, wherein the cyclonic separating unit comprises a bin that forms an outer wall of the cyclonic separator.

24. The vacuum cleaning apparatus of claim 23, where the wipe is attached to the bin.

25. The vacuum cleaning apparatus of claim 18, wherein the wipe comprises an elastomeric material.

26. The vacuum cleaner of claim 4, wherein the second cyclonic separating unit comprises a plurality of second cyclones.

27. The vacuum cleaner of claim 26, wherein the second cyclonic separating unit is moveable with the screen.

* * * * *